(12) United States Patent
Chen et al.

(10) Patent No.: US 8,655,024 B2
(45) Date of Patent: Feb. 18, 2014

(54) DISPLACEMENT DETECTION DEVICE AND DISPLACEMENT DETECTION METHOD THEREOF

(75) Inventors: Chun Wei Chen, Hsin-Chu (TW); Hsin Chia Chen, Hsin-Chu (TW)

(73) Assignee: Pixart Imaging Inc., Hsin-Chu County (TW)

(*) Notice: Subject to any disclaimer, the term of this patent is extended or adjusted under 35 U.S.C. 154(b) by 391 days.

(21) Appl. No.: 13/044,001

(22) Filed: Mar. 9, 2011

(65) Prior Publication Data

US 2011/0261231 A1    Oct. 27, 2011

(30) Foreign Application Priority Data

Apr. 23, 2010    (TW) .............................. 99112837 A

(51) Int. Cl.
- *G06K 9/00* (2006.01)
- *G06F 3/033* (2013.01)

(52) U.S. Cl.
USPC .......................................... 382/106; 345/166

(58) Field of Classification Search
USPC ......... 382/167, 199, 218, 284, 286, 291, 295, 382/312, 103, 106, 107, 140, 181, 236; 348/239, 294; 358/520, 521; 345/157–167, 173, 179, 629, 672
See application file for complete search history.

(56) References Cited

U.S. PATENT DOCUMENTS

| | | | |
|---|---|---|---|
| 7,042,439 B2 | 5/2006 | Luo | |
| 7,442,916 B2 * | 10/2008 | Lee et al. | 250/221 |
| 7,502,515 B2 * | 3/2009 | Gu et al. | 382/236 |
| 2005/0110746 A1 * | 5/2005 | Hou | 345/156 |
| 2007/0291001 A1 | 12/2007 | Trisnadi et al. | |
| 2009/0128488 A1 | 5/2009 | Ang et al. | |
| 2009/0135140 A1 | 5/2009 | Constantin et al. | |
| 2009/0160774 A1 | 6/2009 | Lee et al. | |
| 2009/0195505 A1 * | 8/2009 | Chen et al. | 345/166 |
| 2010/0103323 A1 | 4/2010 | Wredenhagen | |
| 2010/0207872 A1 * | 8/2010 | Chen et al. | 345/156 |

FOREIGN PATENT DOCUMENTS

TW    200928880 A    7/2009

\* cited by examiner

*Primary Examiner* — Kanjibhai Patel

(57) ABSTRACT

A displacement detection method includes the steps of: acquiring an image frame; calculating a characteristic index of the image frame; maintaining the image frame when the characteristic index is larger than a threshold value; and adding a fixed pattern to the image frame when the characteristic index is smaller than the threshold value. The present invention further provides a displacement detection device.

17 Claims, 5 Drawing Sheets

DISPLACEMENT DETECTION DEVICE AND DISPLACEMENT DETECTION METHOD THEREOF

CROSS REFERENCE TO RELATED APPLICATION

This application claims the priority benefit of Taiwan Patent Application Serial Number 099112837, filed on Apr. 23, 2010, the full disclosure of which is incorporated herein by reference.

BACKGROUND

1. Field of the Invention

This invention generally relates to a displacement detection device and, more particularly, to a displacement detection device and a displacement detection method thereof that have a high tolerance to the working surface and a high accuracy of the displacement detection.

2. Description of the Related Art

Conventional optical mice generally include an image sensor and a processing unit. The image sensor is configured to acquire a plurality of images of a working surface at different time intervals. The processing unit compares the correlation between the images so as to calculate a displacement of the optical mice with respect to the working surface. A control unit is configured to relatively control the motion of a cursor shown on a display device according to the displacement outputted by the optical mice.

When an optical mouse is being operated upon a critical surface, because images acquired by the image sensor thereof do not have enough characteristic variation (e.g. a contrast variation or a gray level variation is too low), the processing unit is hardly able to obtain accurate displacement of the optical mouse with respect to the critical surface according to the correlation between acquired images. Therefore, the optical mouse might not able to accurately control the motion of a cursor shown on a display device by moving on the critical surface. In addition, when the optical mouse is at rest, the cursor jiggles (referred as rest jiggle herein) on the screen; and when the optical mouse is lifted from the working surface, the cursor also jiggles (referred as lift jiggle herein) on the screen.

Conventionally, the characteristic variation or the image quality of an image can be estimated by calculating a characteristic index thereof so as to determine whether an acquired image is suitable for being used to calculate a displacement. When the characteristic index of the images of a working surface acquired by the image sensor is smaller than a threshold value, it means that the optical mouse is not able to accurately control the motion of a cursor by moving on the working surface. However, the selection of the threshold value will determine a tolerance to the working surface of the optical mouse. If the threshold value is higher, although the cursor jiggle can be reduced, the working surface that the optical mouse is being operated upon needs to have more apparent characteristic variation such that a limitation to the working surface is also increased. If the threshold value is lower, although the limitation to the working surface acceptable to the optical mouse is decreased, the cursor jiggle becomes more apparent.

Accordingly, it is necessary to provide a displacement detection device and displacement detection method thereof that can simultaneously increase a tolerance to the working surface of the optical mouse and reduce the phenomena of rest jiggle and lift jiggle.

SUMMARY

The present invention provides a displacement detection device and displacement detection method thereof that may increase the characteristic index of acquired image frames by means of adding a fixed pattern thereto.

The present invention further provides a displacement detection device and displacement detection method thereof that has a higher tolerance to the working surface and higher jiggle suppression ability.

The present invention provides a displacement detection method including the steps of: acquiring a first image frame; calculating a first characteristic index of the first image frame; comparing the first characteristic index with a threshold value; and adding a fixed pattern to the first image frame to form a second image frame when the first characteristic index is smaller than the threshold value.

In an aspect, the displacement detection method of the present invention further includes the steps of: calculating a second characteristic index of the second image frame; comparing the second characteristic index with the threshold value; and calculating a displacement according to the second image frame when the second characteristic index is larger than the threshold value.

In another aspect, the displacement detection method of the present invention further includes the steps of: calculating a second characteristic index of the second image frame; comparing the second characteristic index with the threshold value; identifying the first image frame as a usable image frame when the second characteristic index is larger than the threshold value; and identifying the first image frame as an unusable image frame when the second characteristic index is smaller than the threshold value.

In another aspect, the first image frame is an image frame of a working surface. The displacement detection method of the present invention further includes the steps of: calculating a second characteristic index of the second image frame; comparing the second characteristic index with the threshold value; identifying the working surface as a usable working surface when the second characteristic index is larger than the threshold value; and identifying the working surface as an unusable working surface when the second characteristic index is smaller than the threshold value.

The present invention further provides a displacement detection device including an image sensor and a processing unit. The image sensor is configured to acquire an image frame. The processing unit calculates a characteristic index of the image frame, compares the characteristic index with a threshold value, and adds a fixed pattern to the image frame when the characteristic index is smaller than the threshold value.

In an aspect, the processing unit of the displacement detection device of the present invention further calculates a second characteristic index of the image frame being added with the fixed pattern and identifies whether the image frame is a usable image frame according a comparison result of comparing the second characteristic index and the threshold value.

In another aspect, the processing unit of the displacement detection device of the present invention further calculates a second characteristic index of the image frame being added with the fixed pattern and calculates a displacement according to the image frame being added with the fixed pattern when the second characteristic index is larger than the threshold value.

The present invention further provides a displacement detection method including the steps of: acquiring an image frame; calculating a characteristic index of the image frame; and comparing the characteristic index with a threshold value to determine whether to add a fixed pattern to the image frame.

In an aspect, the displacement detection method further includes the steps of: maintaining (i.e. without post-processing) the image frame when the characteristic index is larger than the threshold value; and adding a fixed pattern to the image frame when the characteristic index is smaller than the threshold value.

In the displacement detection device of the present invention and displacement detection method thereof, the fixed pattern, is to offset a gray level value of a partial area of the image frame, and preferably is to offset the gray level value of an edge area of the image frame.

In the displacement detection device of the present invention and displacement detection method thereof, the characteristic index may be a gray level variation, a contrast variation or other characteristic parameters for indicating the image quality.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

Figure 1:
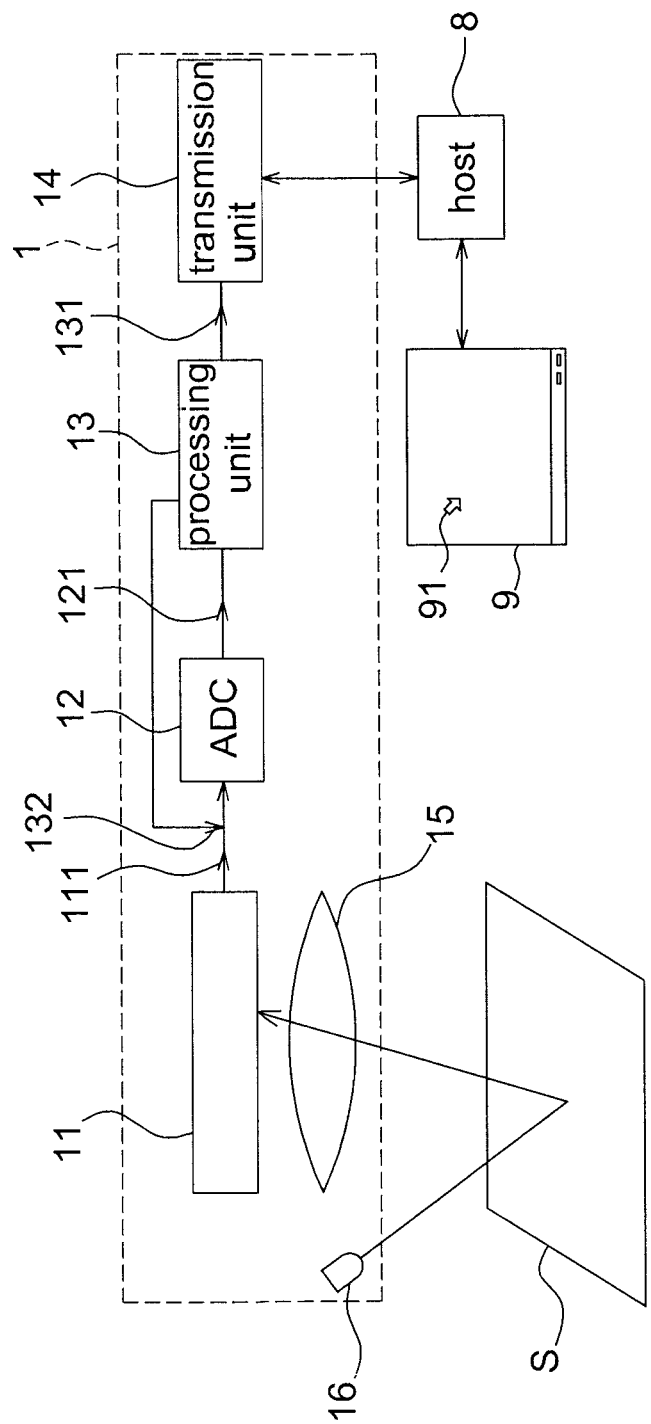
FIG. 1 shows a block schematic diagram of the displacement detection device according to an embodiment of the present invention.

In the drawings of the present invention, only a part of the components are shown and other components that are not directly pertinent to the illustration of the present invention are omitted.

Please refer to FIG. 1, it shows a block schematic diagram of the displacement detection device according to an embodiment of the present invention. The displacement detection device 1 detects and transmits displacement information to a host 8. The host 8 may control the motion of a cursor 91 shown on a display device 9 or executes an application according to the displacement information received. The displacement detection device 1 may be an optical mouse.

The displacement detection device 1 includes an image sensor 11, an analog-to-digital converter (ADC) 12, a processing unit 13, a transmission unit 14, a light guiding unit 15 and a light source 16. The displacement detection device 1 is configured to be operated on a working surface S and to output the displacement information to the host 8, wherein the data transmission between the displacement detection device 1 and the host 8 may be implemented by using conventional wireless or wired communication techniques.

The light source 16 may be a light emitting diode, a laser diode or other suitable light sources for illuminating the working surface S such that image frames acquired by the image sensor 11 can have enough brightness. The light guiding unit 15 may be, but not limited to, a lens or a lens set made of suitable material, and is configured to guide the reflected light from the working surface S to the image sensor 11 to improve the sensing efficiency thereof. The image sensor 11 may be a CCD image sensor, a CMOS image sensor or other suitable image sensors configured to sense the reflected light from the working surface S so as to output an analog image frame 111. The analog-to-digital converter 12 converts the analog image frame 111 to a digital image frame 121, wherein the conversion between the analog image frame and the digital image frame is well know to the art and thus details thereof will not be described herein.

After receiving the digital image frame 121, the processing unit 13 calculates a characteristic index (examples will be given hereinafter) of the digital image frame 121 so as to identify whether the digital image frame 121 contains an apparent characteristic variation for calculating a displacement. If the characteristic variation of the digital image frame 121 is not obvious enough, the displacement may not be able to be calculated accurately. The characteristic index illustrated herein may be, but not limited to, a brightness variation (i.e. gray level variation) or a contrast variation of the image frame or other characteristic parameters for indicating image quality.

When the characteristic index is larger than a threshold value, the processing unit 13 identifies that the digital image frame 121 is a usable image frame and thus calculates a displacement according to the digital image frame 121, wherein the displacement may be calculated according to a correlation between image frames. When the characteristic index is smaller than a threshold value, the processing unit 13 adds a fixed pattern to the digital image frame 121 to increase the characteristic index thereof. Only when the characteristic index of the image frame being added with the fixed pattern is larger than the threshold value, the image frame being added with the fixed pattern will be utilized to calculate the displacement. However, if the characteristic index of the image frame being added with the fixed pattern is still smaller than the threshold value, the processing unit 13 identifies that the digital image frame 121 is an unusable image frame, i.e. the displacement detection device 1 is not suitable for the working surface S. In another embodiment, a fixed pattern 132 may also be added to the analog image frame 111 and then be converted to a digital image frame together with the original analog image frame 111 by the analog-to-digital converter 12. That is, the fixed pattern may be an analog frame data or a digital frame data herein. Finally, the processing unit 13 calculates a displacement and transmits the calculated displacement to the host 8 through the transmission unit 14. It should be noted that in this embodiment a comparison result between a characteristic index and a threshold value is served as a rule to determine whether to add a fixed pattern or not. Although the rule in this embodiment is set as adding a fixed pattern when the characteristic index is smaller than the threshold value, a person skilled in the art may modify the characteristic index without destroying the property thereof after understanding the present invention. For example, the sign of the characteristic index may be changed in order to design other corresponding identification rules and this kind of modification does not depart from the spirit and scope of the present invention.

Figure 2A:
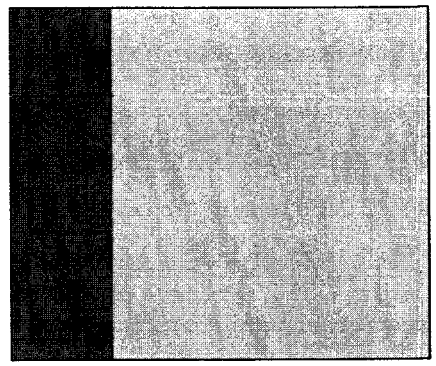
FIG. 2*a* shows a schematic diagram of the fixed pattern according to an embodiment of the present invention.
Figure 2B:
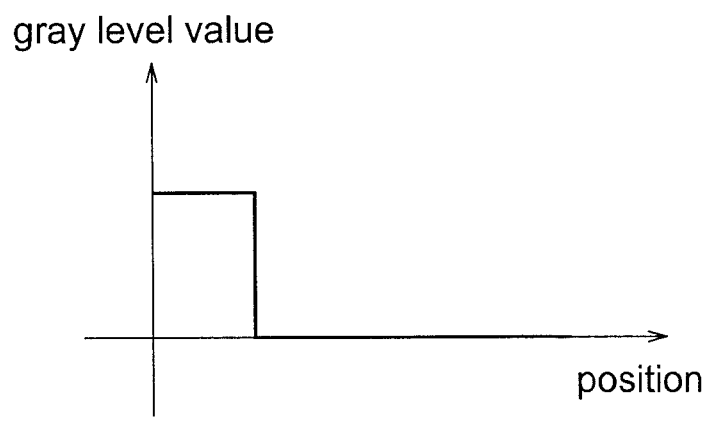
FIG. 2*b* shows a schematic diagram of the gray level distribution of the fixed pattern shown in FIG. 2*a*.
Figure 2C:
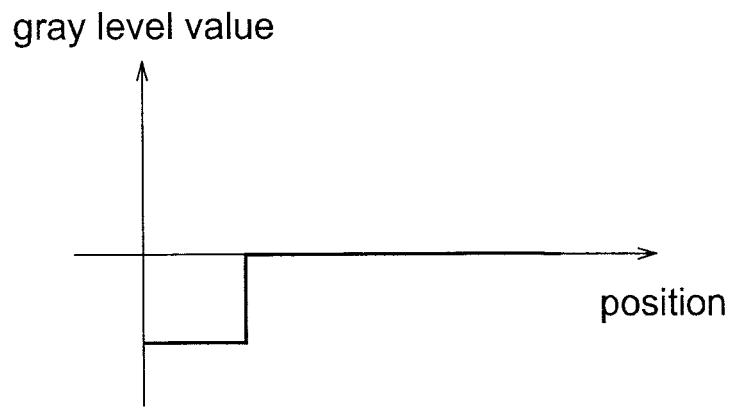
FIG. 2*c* shows another schematic diagram of the gray level distribution of the fixed pattern shown in FIG. 2*a*.

Please refer to FIGS. 2a to 2c, FIG. 2a shows a schematic diagram of the fixed pattern according to an embodiment of the present invention and FIGS. 2b and 2c respectively show a schematic diagram of the gray level distribution of the fixed pattern shown in FIG. 2a, wherein an edge area of the fixed pattern may have a higher or lower gray level value than the rest area. In the present invention, the fixed pattern added to the image frames acquired by the image sensor 11 is configured to offset the gray level value of a partial area of the image frames so as to increase the characteristic index thereof. In this manner, the processing unit 13 is able to calculate the displacement accurately so as to avoid jiggle of the cursor shown on the display screen when the displacement detection device 1 is at rest or lifted up. For example, when the processing unit 13 calculates the displacement according to the correlation between a reference frame and a current frame, the fixed pattern is added to both the reference frame and the current frame. In this manner, when the displacement detection device 1 is at rest on or lifted up from the working surface S, the processing unit 13 may identify that the displacement detection device 1 is not moving relative to the working surface S based on the fixed pattern added into the reference frame and the current frame thereby solving the phenomena of rest jiggle and lift jiggle.

FIG. 2b shows that an area with higher gray level value is added to an edge area of the image frames acquired by the image sensor 11 while FIG. 2c shows that an area with lower gray level value is added to an edge area of the image frames acquired by the image sensor 11. Since the processing unit 13 generally uses the central part of the image frames to calculate the displacement, it is preferably to offset the gray level value of an edge area of the image frames in the present invention without affecting the calculation of the displacement. In addition, the fixed pattern are not limited to those shown in FIGS. 2a to 2c, other fixed patterns may be used as long as the gray level distribution of the fixed pattern to be added can increase the characteristic index.

Figure 3:
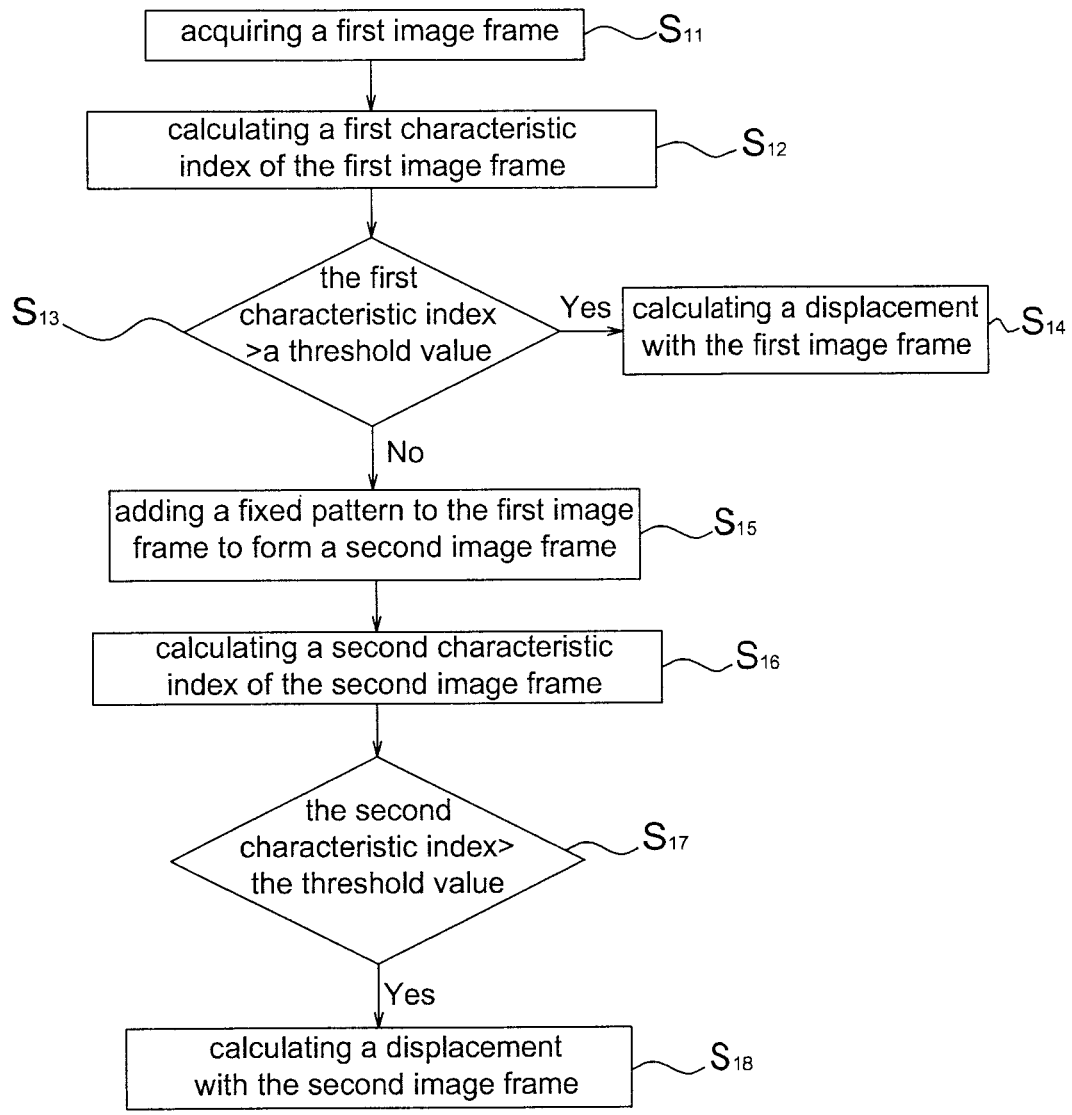
FIG. 3 shows a flow chart of the displacement detection method according to an embodiment of the present invention.

Please refer to FIG. 3, it shows a flow chart of the displacement detection method according to an embodiment of the present invention, which includes the steps of: capturing a first image frame (Step $S_{11}$); calculating a first characteristic index of the first image frame (Step $S_{12}$); identifying whether the first characteristic index is larger than a threshold value (Step $S_{13}$); if yes, calculating a displacement according to the first image frame (Step $S_{14}$); if the first characteristic index is not larger than the threshold value, adding a fixed pattern to the first image frame to form a second image frame (Step $S_{15}$); calculating a second characteristic index of the second image frame (Step $S_{16}$); identifying whether the second characteristic index is larger than the threshold value (Step $S_{17}$); and calculating a displacement according to the second image frame (Step $S_{18}$).

Referring to FIGS. 1 to 3 together, the displacement detection method of the present invention will be illustrated hereinafter. At first, the image sensor 11 acquires a first image frame (Step $S_{11}$), which may be a digital image frame or an analog image frame herein, wherein when the first image frame is an analog image frame, it will be converted to a digital image frame by the analog-to-digital converter 12 and then be inputted into the processing unit 13. The processing unit 13 calculates a first characteristic index of the first image frame (Step $S_{12}$) and identifies whether the first characteristic index is lager than a threshold value (Step $S_{13}$), wherein the first characteristic index and the threshold value will illustrated by an embodiment hereinafter. When identifying that the first characteristic index is larger than the threshold value, the processing unit 13 directly uses the first image frame to calculate a displacement (Step $S_{14}$) and outputs the calculated displacement to the transmission unit 14. When identifying that the first characteristic index is smaller than the threshold value, the processing unit 13 adds a fixed pattern (for example those shown in FIGS. 2a to 2c) to the first image frame to form a second image frame, wherein the fixed pattern may be a digital frame data or an analog frame data herein. For example, if the fixed pattern is a digital frame data, it is added to the digital image frame 121, wherein the addition procedure may be performed directly by the processing unit 13. If the fixed pattern is an analog frame data, it is added to the analog image frame 111 (Step $S_{15}$). The processing unit 13 calculates a second characteristic index of the second image frame (Step $S_{16}$) and compares the second image frame with the threshold value (Step $S_{17}$). When identifying that the second characteristic index is larger than the threshold value, the processing unit 13 uses the second image frame to calculate a displacement (Step $S_{18}$) and then outputs the calculated displacement to the transmission unit 14.

Figure 4:
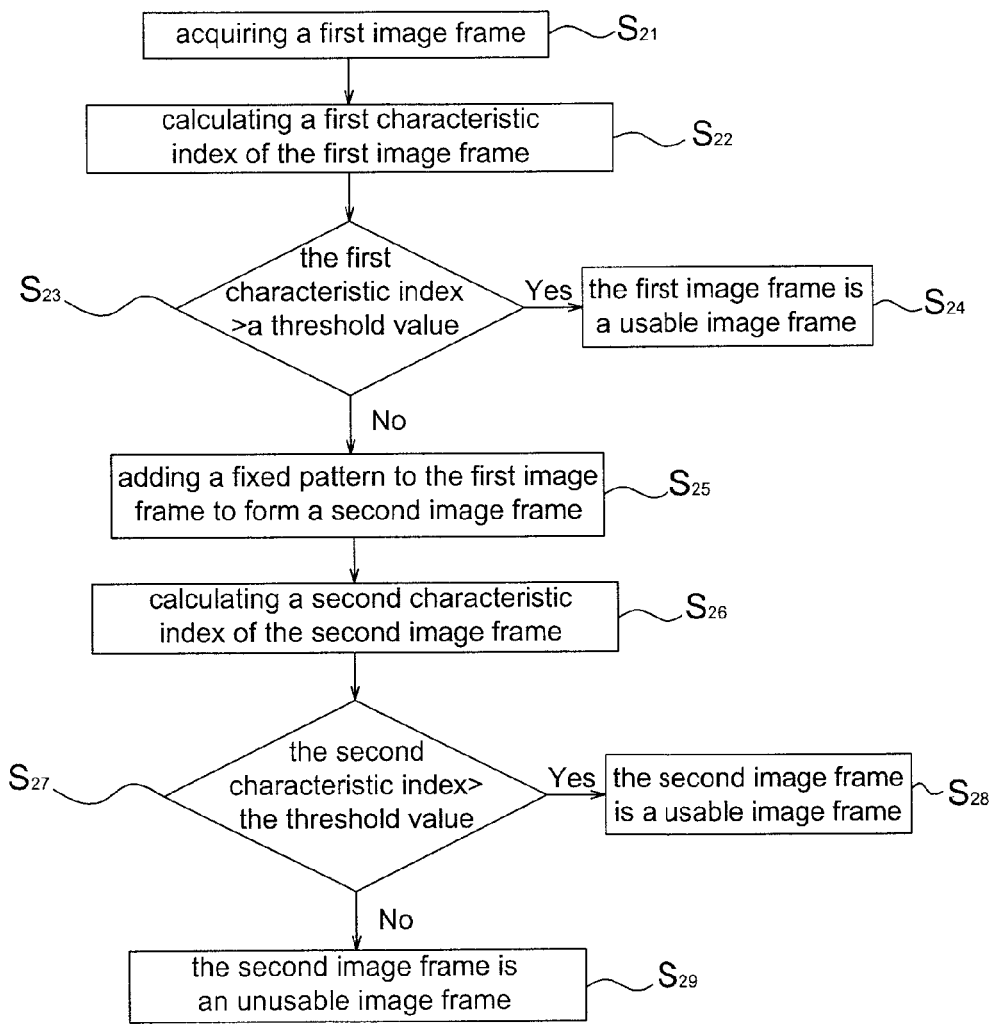
FIG. 4 shows a flow chart of the displacement detection method according to another embodiment of the present invention.

Please refer to FIG. 4, it shows a flow chart of the displacement detection method according to another embodiment of the present invention, which includes the steps of: acquiring a first image frame (Step $S_{21}$); calculating a first characteristic index of the first image frame (Step $S_{22}$); identifying whether the first characteristic index is larger than a threshold value (Step $S_{23}$); if yes, identifying the first image frame as a usable image frame (Step $S_{24}$); if the first characteristic index is not larger than the threshold value, adding a fixed pattern to the first image frame to form a second image frame (Step $S_{25}$); calculating a second characteristic index of the second image frame (Step $S_{26}$); identifying whether the second characteristic index is larger than the threshold value (Step $S_{27}$); if yes, identifying the second image frame as a usable image frame (Step $S_{28}$); if the second characteristic index is not larger than the threshold value, identifying the second image frame as an unusable image frame (Step $S_{29}$). Details of steps of this embodiment are similar to those of FIG. 3 and thus details will not be repeated herein.

In addition, if the first characteristic index is smaller than the threshold value, it means that the displacement detection device 1 may not be applicable to the current working surface. The present invention may increase the characteristic index by adding a fixed pattern so as to increase the applicable working surface. If the second characteristic index is larger than the threshold value, it means that the displacement detection device 1 is still applicable to the current working surface by adopting the displacement detection method of the present invention. However, if the second characteristic index is still smaller than the threshold value, it means that the displacement detection device 1 is not applicable to the current working surface. Therefore, the present invention is also able to increase the tolerance to the working surface of a displacement detection device.

In a word, the displacement detection method of the present invention includes the steps of: capturing an image frame; calculating a characteristic index of the image frame; maintaining the image frame when the characteristic index is larger than a threshold value; and adding a fixed pattern to the image frame when the characteristic index is smaller than the threshold value.

Next, an embodiment of the characteristic index is provided, but this embodiment is only for illustration rather than limitation.

Figure 5:
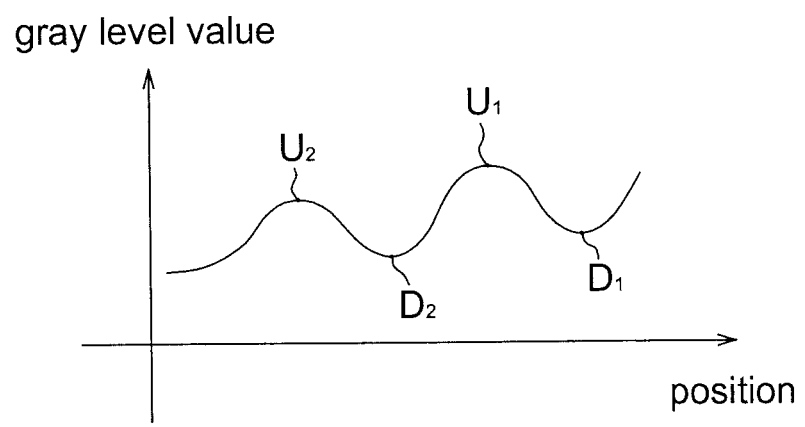
FIG. 5 shows a schematic diagram of a characteristic index applicable in the displacement detection method according to the embodiment of the present invention.

Please refer to FIG. 5, it shows a schematic diagram of a characteristic index adopted in the displacement detection method according to the embodiment of the present invention. An image characteristic variation may be, for example, a gray level variation of one dimensional pixels of an image frame acquired by the image sensor, and the characteristic index may be, for example, a peak number of the gray level variation of one dimensional pixels. For example, it is assumed that in one column of pixels or one row of pixels of the image frame, when the gray level values of neighboring pixels of a specific pixel is smaller than the specific pixel a predetermined scale, the specific pixel is an upper peak; and when the gray level values of neighboring pixels of a specific pixel is higher than the specific pixel a predetermined scale, the specific pixel is a down peak. For example FIG. 5 includes two upper peaks $U_1$, $U_2$ and two down peaks $D_1$, $D_2$. The characteristic index may be, for example, a number of the upper peaks, a number of the down peaks and/or a total number of the upper peaks and down peaks. The threshold value may be set as a predetermined number of the peak number. In the image frame acquired by the image sensor 11, higher peak number indicates more apparent characteristic variation of the acquired image frame, and thus the characteristic variation of the image frame may be determined by setting different threshold values of the peak number. In addition, the characteristic index of the present invention may also be other characteristic parameters for indicating the image quality and is not limited to that shown in FIG. 5.

As mentioned above, as in conventional displacement detection devices the cursor has the jiggle problem, thus the present invention further provides a displacement detection device (FIG. 1) and displacement detection methods (FIGS. 3 to 4) to solve this problem. In this invention, the characteristic variation of acquired image frames is increased by adding a fixed pattern thereto so as to increase the tolerance to the working surface and the jiggle suppression ability of a displacement detection device.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A displacement detection method of detecting displacement of an optical mouse navigation device with respect to a working surface, the displacement detection method comprising:
   acquiring a first image frame with an image sensor;
   calculating, using a processing unit, a first characteristic index of the first image frame;
   comparing, using the processing unit, the first characteristic index with a threshold value;
   calculating, using the processing unit, a displacement according to the first image frame when the first characteristic index is larger than the threshold value;
   adding, using the processing unit, a fixed pattern to the first image frame to form a second image frame when the first characteristic index is smaller than the threshold value;
   calculating, using the processing unit, a second characteristic index of the second image frame;
   comparing, using the processing unit, the second characteristic index with the threshold value; and
   calculating, using the processing unit, a displacement according to the second image frame when the second characteristic index is larger than the threshold value.

2. The displacement detection method as claimed in claim 1, wherein the fixed pattern offsets a gray level value of a partial area of the first image frame.

3. The displacement detection method as claimed in claim 2, wherein the fixed pattern offsets the gray level value of an edge area of the first image frame.

4. The displacement detection method as claimed in claim 1, wherein the first characteristic index is a gray level variation or a contrast variation of the first image frame: and
   the second characteristic index is a gray level variation or a contrast variation of the second image frame.

5. The displacement detection method as claimed in claim 1, further comprising:
   identifying the first image frame as a usable image frame when the second characteristic index is larger than the threshold value; and
   identifying the first image frame as an unusable image frame when the second characteristic index is smaller than the threshold value.

6. The displacement detection method as claimed in claim 1, further comprising:
   identifying the first image frame as a usable image frame when the first characteristic index is larger than the threshold value.

7. The displacement detection method as claimed in claim 1, wherein the first image frame is an image frame of the working surface, and the displacement detection method further comprises:
   calculating a second characteristic index of the second image frame;
   comparing the second characteristic index with the threshold value;
   identifying the working surface as a usable working surface when the second characteristic index is larger than the threshold value; and
   identifying the working surface as an unusable working surface when the second characteristic index is smaller than the threshold value.

8. A displacement detection device of an optical mouse navigation device for detecting displacement with respect to a working surface, the displacement detection device comprising:
   an image sensor configured to acquire an image frame;
   a processing unit for calculating a characteristic index of the image frame, comparing the characteristic index with a threshold value, adding a fixed pattern to the image frame when the characteristic index is smaller than the threshold value, calculating a second characteristic index of the image frame being added with the fixed pattern and calculating a displacement according to the image frame being added with the fixed pattern when the second characteristic index is larger than the threshold value.

9. The displacement detection device as claimed in claim 8, wherein the fixed pattern is an analog frame data or a digital frame data.

10. The displacement detection device as claimed in claim 8, wherein the fixed pattern offsets a gray level value of a partial area of the image frame.

11. The displacement detection device as claimed in claim 10, wherein the fixed pattern offsets the gray level value of an edge area of the image frame.

12. The displacement detection device as claimed in claim 8, wherein the characteristic index is a gray level variation or a contrast variation of the image frame.

13. The displacement detection device as claimed in claim 8, wherein the processing unit further calculates a second characteristic index of the image frame being added with the fixed pattern and identifies whether the image frame is a usable image frame according a comparison result of comparing the second characteristic index and the threshold value.

14. The displacement detection device as claimed in claim 8, wherein the displacement detection device is an optical mouse.

15. A displacement detection method of detecting displacement of an optical mouse navigation device with respect to a working surface, the displacement detection method comprising:
- acquiring an image frame with an image sensor;
- calculating, using a processing unit, a characteristic index of the image frame;
- identifying, using the processing unit, the image frame as a usable frame for calculating a displacement when the characteristic index is larger than a threshold value; and
- adding, using the processing unit, a fixed pattern to the image frame when the characteristic index is smaller than the threshold value.

16. The displacement detection method as claimed in claim 15, wherein the fixed pattern offsets a gray level value of an edge area of the image frame.

17. The displacement detection method as claimed in claim 15, wherein the characteristic index is a gray level variation or a contrast variation of the image frame.

\* \* \* \* \*